US012030557B2

(12) United States Patent (10) Patent No.: US 12,030,557 B2
Sukhdeo et al. (45) Date of Patent: Jul. 9, 2024

(54) CONNECTOR FOR REMOVABLE TAILGATE

(71) Applicants: Richard Sukhdeo, Auburn Hills, MI (US); Samuel J Matt, Oxford, MI (US)

(72) Inventors: Richard Sukhdeo, Auburn Hills, MI (US); Samuel J Matt, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 416 days.

(21) Appl. No.: 17/404,274

(22) Filed: Aug. 17, 2021

(65) Prior Publication Data
US 2023/0055414 A1 Feb. 23, 2023

(51) Int. Cl.
*B62D 33/027* (2006.01)
*B62D 33/033* (2006.01)
*F16B 21/12* (2006.01)
*F16B 39/04* (2006.01)

(52) U.S. Cl.
CPC ....... *B62D 33/0273* (2013.01); *B62D 33/033* (2013.01); *F16B 21/125* (2013.01); *F16B 39/04* (2013.01)

(58) Field of Classification Search
CPC .. B62D 33/0273; B62D 33/03; B62D 33/037; F16B 19/109; F16B 21/125; F16B 39/04; E05D 11/0018; E05D 11/0027; E05D 2011/0045; E05Y 2900/546
USPC ............... 411/103, 116, 347, 348, 209–211, 411/315–318
See application file for complete search history.

(56) References Cited

U.S. PATENT DOCUMENTS

| | | | | |
|---|---|---|---|---|
| 3,145,441 A | | 8/1964 | Strandrud | |
| 3,180,390 A | * | 4/1965 | Ockert, Jr. | ............ F16B 21/165 411/945 |
| 4,681,495 A | * | 7/1987 | Crespin | ................. F16B 21/165 411/21 |
| 4,759,671 A | * | 7/1988 | Duran | ................... F16B 21/125 411/347 |
| 5,358,301 A | * | 10/1994 | Konchan | ............ B62D 33/0273 49/389 |
| 5,394,594 A | * | 3/1995 | Duran | ................... F16B 21/165 403/321 |
| 5,823,022 A | * | 10/1998 | Barker | ............... B62D 33/0273 70/164 |
| 7,549,691 B2 | * | 6/2009 | Schulte | ............. B62D 33/0273 296/57.1 |
| 8,696,046 B2 | * | 4/2014 | Sackett | ............. B62D 33/0273 296/57.1 |
| 10,293,868 B2 | * | 5/2019 | Jergess | ................. B62D 33/037 |

(Continued)

*Primary Examiner* — Gregory A Blankenship
(74) *Attorney, Agent, or Firm* — Jeremy J. Klobucar

(57) ABSTRACT

A connector for a removable tailgate includes a shank, an actuator and a retainer. The shank has a thread, a passage and an opening from the exterior of the shank to the passage. The actuator is received within the passage and has a stop portion and a void, and is movable relative to the shank from a first position in which the void is aligned with the opening and a second position in which the stop portion is aligned with the opening. And the retainer is received in the opening and movable relative to the shank from an extended position in which the retainer extends outwardly from the exterior of the shank farther than the thread and a retracted position in which the retainer is received at least partially in the void and in which the retainer does not extend from the exterior of the shank beyond the thread.

20 Claims, 3 Drawing Sheets

(56) References Cited

U.S. PATENT DOCUMENTS

| | | | | |
|---|---|---|---|---|
| 11,584,450 | B2* | 2/2023 | Wilson | B62D 33/03 |
| 2008/0056814 | A1* | 3/2008 | Klingenberg | F16B 19/109 |
| | | | | 24/453 |
| 2017/0274869 | A1* | 9/2017 | Da Deppo | B60R 25/00 |
| 2018/0251164 | A1* | 9/2018 | Jergess | B62D 33/037 |
| 2019/0211598 | A1* | 7/2019 | Hemphill | B62D 33/03 |
| 2020/0040628 | A1* | 2/2020 | Trentin | E05D 3/02 |
| 2020/0047821 | A1* | 2/2020 | Santana | E05F 15/614 |
| 2020/0087962 | A1* | 3/2020 | Trentin | B62D 33/0273 |
| 2020/0399943 | A1* | 12/2020 | Ulewicz | B62D 33/0273 |
| 2022/0089227 | A1* | 3/2022 | Sridhar | B62D 33/077 |

\* cited by examiner

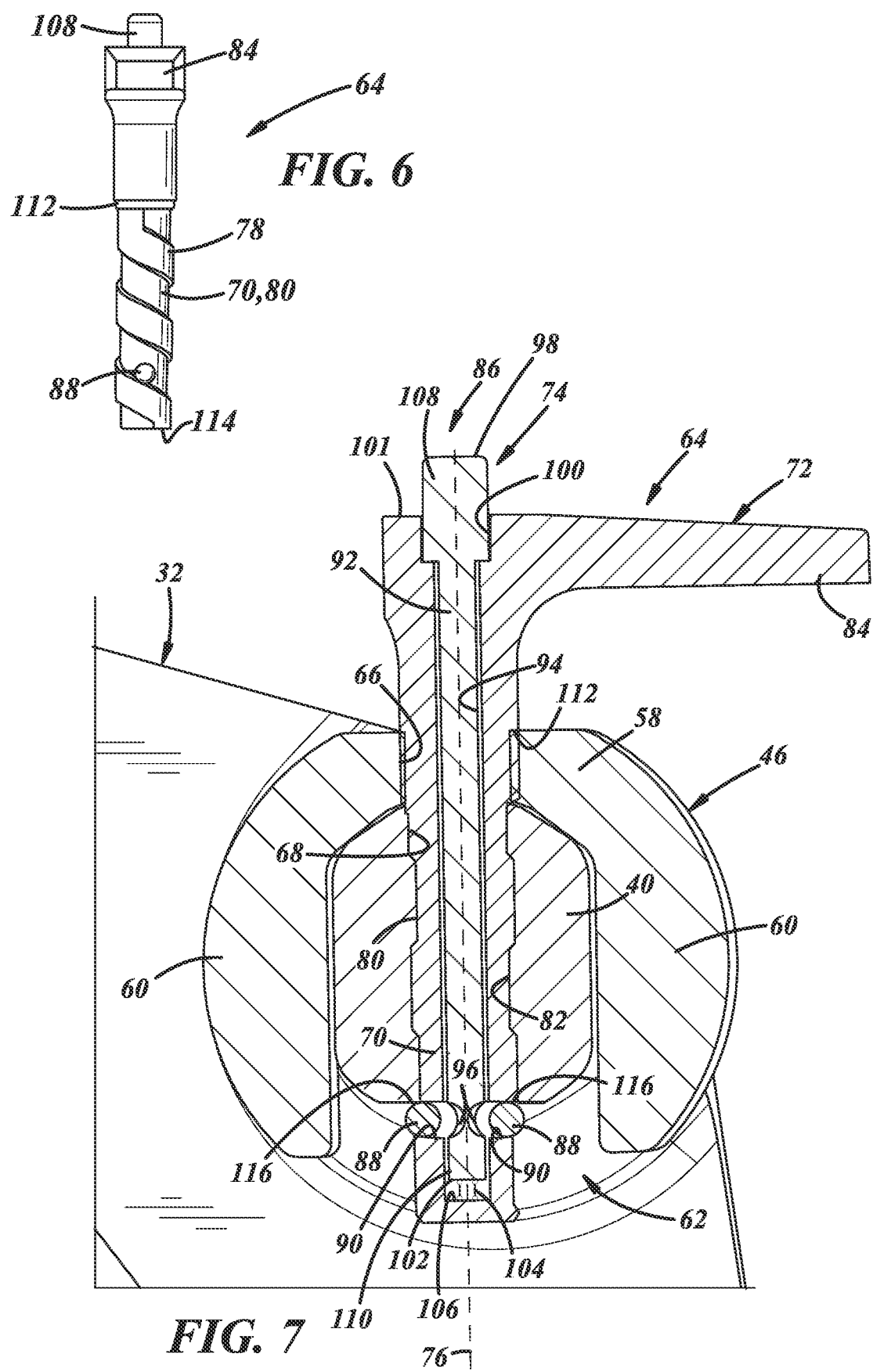

CONNECTOR FOR REMOVABLE TAILGATE

FIELD

The present disclosure relates to a connector for releasable connection of a tailgate to a vehicle.

BACKGROUND

Some vehicles include cargo areas in which items may be placed during transport, for example, a pickup truck bed. The pickup truck bed may be defined in part by a movable tailgate at the rear of the vehicle. In some such vehicles, the tailgate may be removed from the vehicle by removal of bolts with a suitable tool. If access to a tool is not possible in a given location, then the tailgate cannot be removed. Further, removing and re-securing the tailgate to the vehicle is labor intensive.

SUMMARY

In at least some implementations, a connector for a removable tailgate, includes a shank, an actuator and a retainer. The shank has an exterior with a thread, a passage and an opening from the exterior of the shank to the passage. The actuator is received within the passage and has a stop portion and a void, the actuator is movable relative to the shank from a first position in which the void is aligned with the opening and a second position in which the stop portion is aligned with the opening. And the retainer is received in the opening and movable relative to the shank from an extended position in which the retainer extends outwardly from the exterior of the shank farther than the thread and a retracted position in which the retainer is received at least partially in the void and in which the retainer does not extend from the exterior of the shank beyond the thread.

In at least some implementations, the actuator is an inner shaft that is slidably received in the passage and which has a first end that extends out of the passage. In at least some implementations, a spring acts on the inner shaft and biasing the inner shaft to the second position. The first end of the inner shaft may extend farther out of the shank in the second position than in the first position, in at least some implementations.

In at least some implementations, the shank includes a stop surface spaced from the retainer and adapted to engage a component that receives the shank of the connector. The stop surface and retainer may provide a compressive force on the components coupled together by the connector.

In at least some implementations, the opening extends radially through the shank and the opening has a minimum dimension that is smaller than a maximum dimension of the retainer so that the retainer cannot pass completely through the opening.

In at least some implementations, a head is connected to the shank and extending outwardly from the shank. The head may be manually grasped to facilitate manual manipulation of the connector.

In at least some implementations, a tailgate assembly includes a mounting bracket adapted to be connected to a vehicle body and having an opening with an internal thread, a pivot body connected to the mounting bracket and having an opening, a tailgate coupled to the pivot body for rotation between an open position and a closed position, and a connector. The connector has a shank and a retention and release assembly. The shank has an exterior with a thread, a passage in the shank and an opening from the exterior of the shank to the passage. The retention and release assembly includes an inner shaft and a retainer, wherein the inner shaft is received within the passage and has a stop portion and a void. The inner shaft is movable from a first position in which the void is aligned with the opening and a second position in which the stop surface is aligned with the opening. And wherein the retainer is received in the opening, is movable relative to the shank, and has an extended position in which the retainer extends outwardly from the exterior of the shank farther than the thread of the shank, and a retracted position in which the retainer is received at least partially in the void and in which the retainer does not extend from the exterior of the shank beyond the thread.

In at least some implementations, a spring acts on the inner shaft and biasing the inner shaft to the second position. In at least some implementations, the first end of the inner shaft extends farther out of the shank in the second position than in the first position.

In at least some implementations, the shank includes a stop surface spaced from the retainer and engaged with the pivot body when the connector is installed to the pivot body and mounting bracket. In at least some implementations, the stop surface engages the pivot body and the retainer engages the mounting bracket, and the connector applies a compressive force to the pivot body and mounting bracket via the stop surface and retainer.

In at least some implementations, the opening extends radially through the shank and the opening has a minimum dimension that is smaller than a maximum dimension of the retainer so that the retainer cannot pass completely through the opening.

In at least some implementations, the connector also includes a head connected to the shank and extending outwardly from the shank, and by which the shank is rotated relative to the pivot body. The head may be manually manipulated to permit installation and removal of the connector without a tool, in at least some implementations.

In at least some implementations, the internal thread and the thread of the shank are arranged so that the connector is movable to an installed position coupling the pivot body to the mounting bracket, and the connector is removable from the pivot body and mounting bracket with a rotation of the shank of between 90 and 300 degrees. This may facilitate quick installation and removal of the connector to facilitate mounting to and removing a tailgate from a vehicle.

In at least some implementations, the mounting bracket includes a post in which the opening with the internal thread is located, and wherein the pivot body includes a cavity in which the post is received with the opening in the pivot body is aligned with the opening in the post. In at least some implementations, the cavity is U-shaped having an open side through which the post is received into the cavity. In at least some implementations, the cavity includes flat sides and the post includes flat sides such that when the post is received in the cavity, the pivot body cannot rotate relative to the post.

In at least some implementations, the retainer is defined by a pair of balls, and wherein the shank includes two openings with each opening adapted to receive a separate one of the balls. In at least some implementations, the two openings are diametrically opposed and axially aligned.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 6 is a front view of the connector; and

FIG. 7 is a sectional view showing the connector coupled to the pivot body and the mounting bracket.

DETAILED DESCRIPTION

Figure 1:
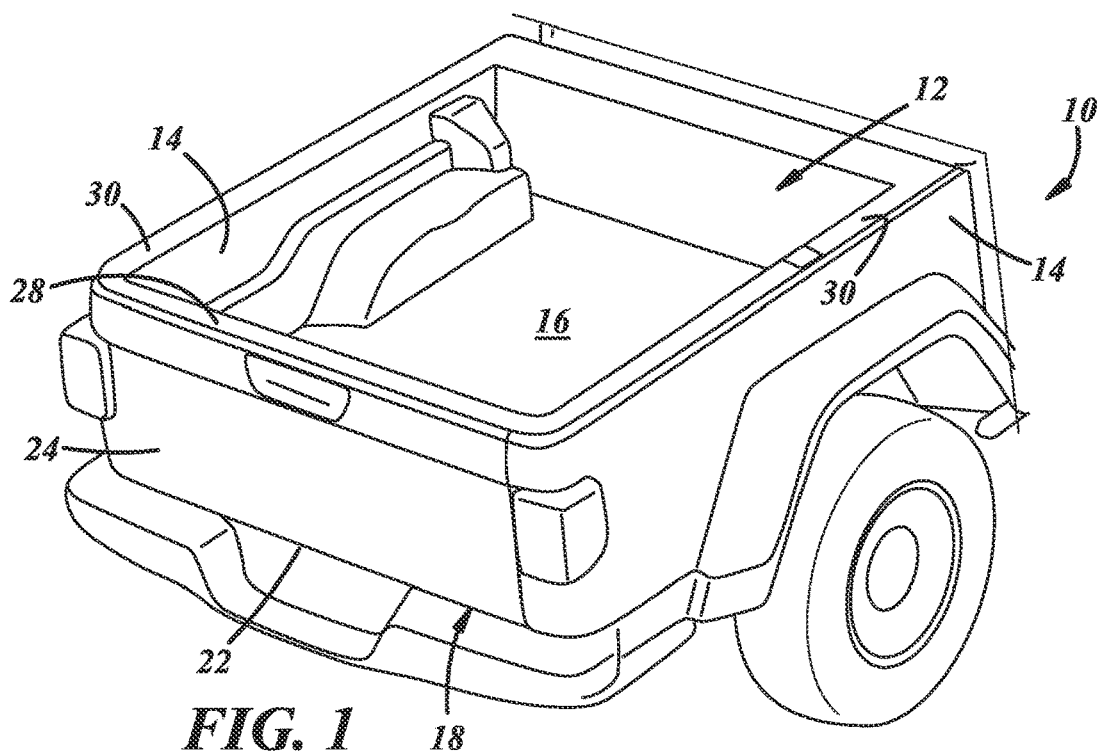
FIG. 1 is a perspective view of a rear portion of a vehicle having a tailgate.

Referring in more detail to the drawings, FIG. 1 illustrates a rear portion of a vehicle 10, commonly called a pickup truck. The truck has a cargo area 12 defined by opposite sidewalls 14, a floor or bed 16 and a tailgate 18 that encloses a rear portion of the cargo area 12. In FIG. 1, the tailgate 18 is shown in a closed position in which the tailgate 18 is generally vertically oriented and encloses an area between the sidewalls 14 of the cargo area 12. To facilitate access to the cargo area 12, the tailgate 18 can be pivoted about an axis 20 (FIG. 2) at a lower end 22 of the tailgate 18 to an open position in which the tailgate 18 is generally horizontal and parallel to the bed 16. When in the closed position, a rear side 24 of the tailgate 18 faces outwardly away from the cargo area 12, a front side 26 (FIG. 2) faces inwardly toward the cargo area 12, an upper end 28 is vertically above the lower end 22, and may be adjacent to upper ends 30 of the sidewalls 14.

Figure 2:
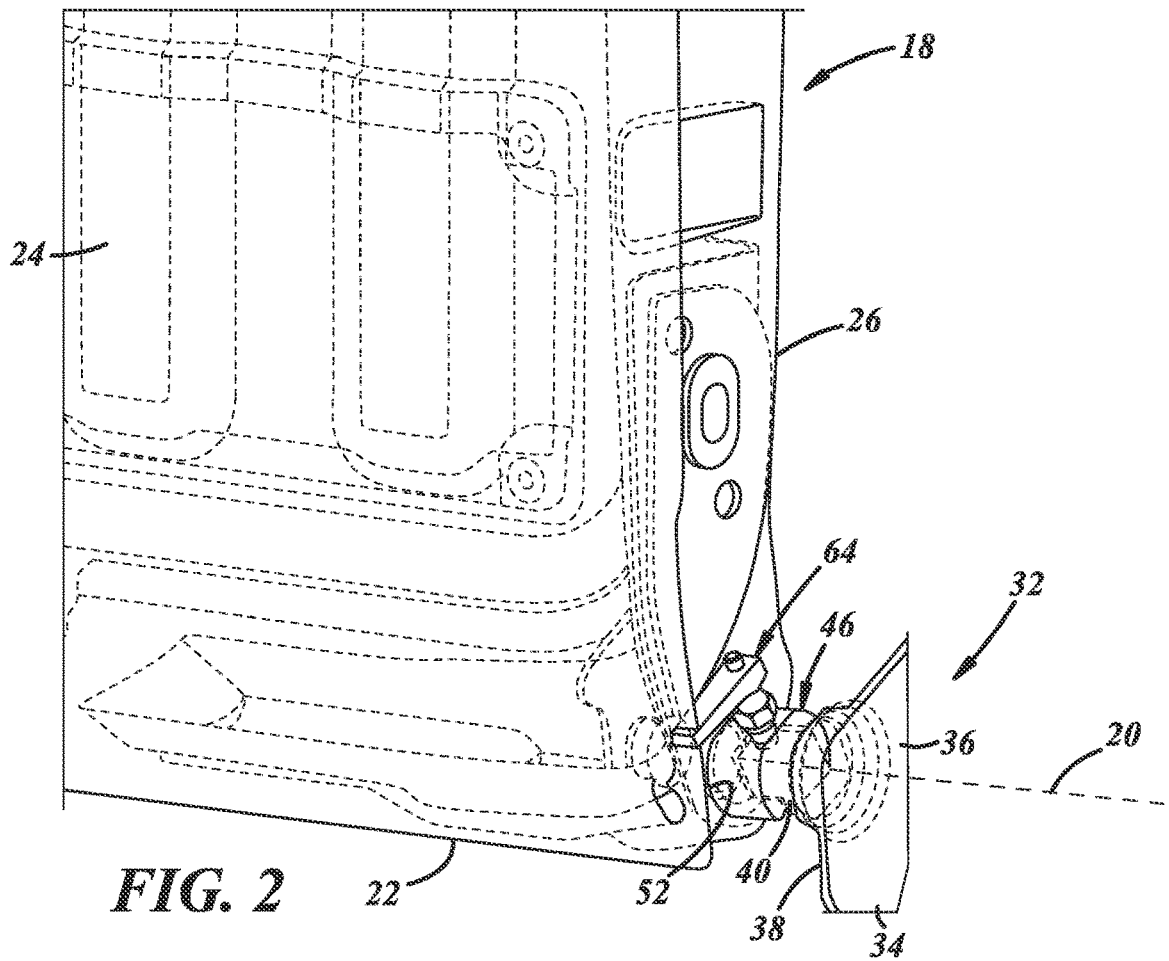
FIG. 2 is a fragmentary perspective view of a portion of the vehicle tailgate, showing a connector that retains the tailgate to a mounting bracket of the vehicle.
Figure 3:
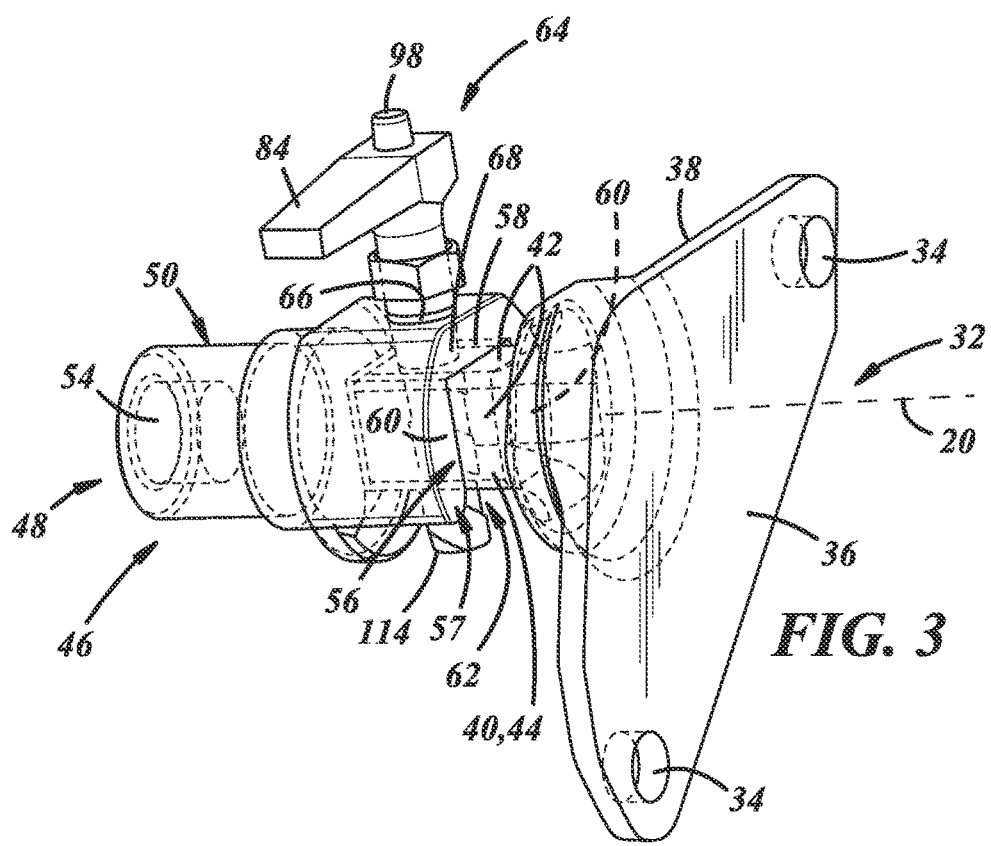
FIG. 3 is a perspective view of the mounting bracket, connector and a pivot body.
Figure 4:
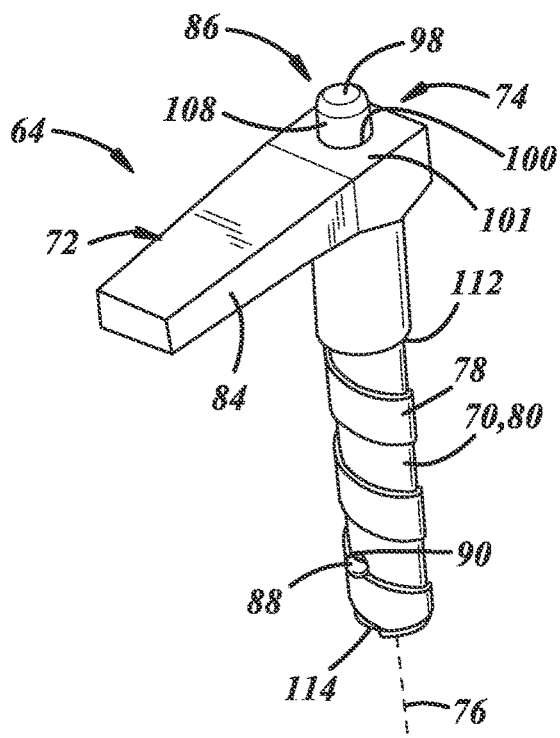
FIG. 4 is a perspective view of the connector.
Figure 5:
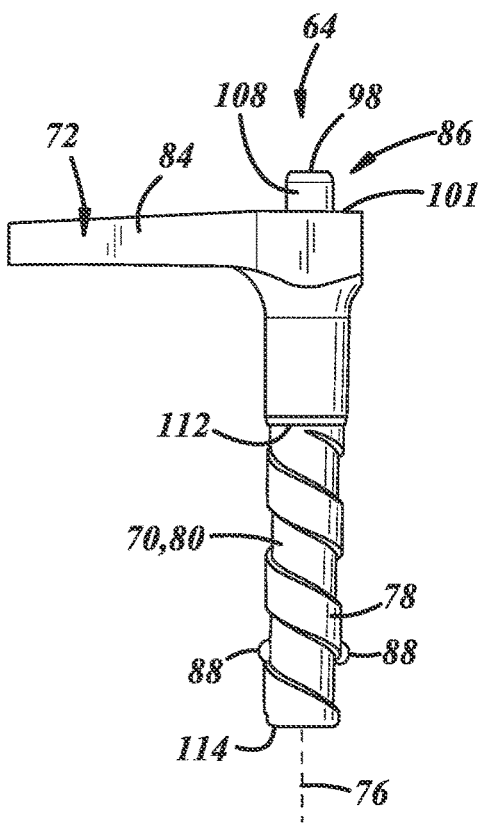
FIG. 5 is a side view of the connector.

As shown in FIGS. 2 and 3, the vehicle 10 includes a mounting bracket 32 to which the tailgate 18 is releasably connected. The mounting bracket 32 may be of any desired size and shape and is shown as being a rounded triangle with a couple spaced apart openings 34 through which suitable bolts are received to secure the mounting bracket 32 to a body or structural member of the vehicle 10. The mounting bracket 32 may be formed from, for example, a metal plate. When assembled to the vehicle 10, an outer side 36 of the mounting bracket 32 is adjacent to a surface of the vehicle 10, and may be generally perpendicular to the axis 20, and an inner side 38 of the mounting bracket 32 faces a side of the tailgate 18.

To provide a surface or structure to which the tailgate 18 may be secured, the mounting bracket 32 includes a post 40 extending from the inner side 38 toward the tailgate 18. The post 40 may be of any desired size and shape and is shown as being rectangular in cross-section, having four flat surfaces 42 that define at least part of an exterior surface 44 of the post 40. The post 40 may be centered on the axis 20, in at least some implementations. And in at least some implementations, the post 40 may be formed from the same piece of material as the remainder of the bracket, or the post 40 may be formed as a separate piece of material that is secured to a body of the bracket, such as by a fastener or weld.

As shown in FIGS. 2 and 3, to connect the tailgate 18 to the mounting bracket 32, the tailgate 18 includes or is associated with a pivot body 46. As best shown in FIG. 3, the pivot body 46 may include a first end 48 having a circular outer surface 50 that may be at least partially received in an opening 52 (FIG. 2) in a side of the tailgate 18, as shown in FIG. 2. The tailgate 18 may rotate about and relative to the pivot body 46 as the tailgate 18 is moved between the open and closed positions. The first end 48 may also include an opening 54 in which a pin coupled to the tailgate 18 is received, with the pin journaled or otherwise received for rotation within the opening 54, so that rotation of the tailgate 18 is controlled. Of course, the pivot body 46 could include a pin and the tailgate 18 may include a void in which the pin is received, if desired. In at least some implementations, the pin and opening 54 are coaxial with the axis of rotation 20 of the tailgate 18, and the pin and opening define the axis 20 about which the tailgate 18 rotates between its open and closed positions.

The pivot body 46 also includes cavity 56 in which at least part of the mounting bracket post 40 is received. The cavity 56 may be formed in or extend to a second end 57 of the pivot body and may be complementarily shaped to the post 40 and sized for close receipt of the post 40 to inhibit play or relative movement between the post 40 and pivot body 46. In the example shown, the cavity 56 is generally U-shaped, having a base 58 and two sides 60 that extend away from the base 58 and, in assembly, overlap at least part of three side surfaces 42 of the post 40. An opening 62 opposite to the base 58 is sized to permit the pivot body 46 to be received over or otherwise onto the post 40 in a direction perpendicular to the axis 20. That is, the surfaces of the pivot body 46 that define the sides 60 of the cavity 56 are spaced apart a distance equal to or greater than a distance between opposite sides 42 of the post 40. While the implementation shown includes flat surfaces of both the post 40 and cavity 56, the post 40 and cavity 56 could instead be defined by round surfaces and, if desired, other anti-rotation features may be provided, for example a pin extending from one component and received in an opening of the other component.

To retain the pivot body 46 on the post 40 of the mounting bracket 32, as shown in FIGS. 3 and 7, a connector 64 is inserted through aligned openings 66, 68 in the pivot body 46 and post 40. In the example shown, the opening 68 in the post 40 is provided through the wall that defines the base 58 of the U-shaped cavity 56. The opening 68 could instead be provided through a wall that defines a side 60 of the cavity 56, or both walls that define both sides 60 of the cavity 56. In the example shown, the opening 68 in the mounting bracket 32 extends fully through the post 40. Thus, in assembly, as shown in FIGS. 3 and 7, the connector 64 extends through both the pivot body 46 and the post 40 of the mounting bracket 32.

In at least some implementations, such as is shown in FIGS. 4-7, the connector 64 includes a shank 70, a head 72, and a retention and release assembly 74. The shank 70 may be generally cylindrical and in assembly is received in the openings 66, 68 of the pivot body 46 and post 40. In at least some implementations, the shank 70 has a central axis 76 and the shank 70 extends through the openings 66, 68 in the pivot body 46 and the post 40, perpendicular to the axis 20 of rotation of the tailgate 18. The shank 70 includes at least one thread 78 that, in at least some implementations, extends along a majority of the axial length of an exterior 80 of the shank 70. As shown in FIG. 7, complementary thread 82 is provided in the interior of the opening 68 of the post 40, and optionally also of the wall 58 that defines the opening 66 in the pivot body 46. Thus, to install or remove the shank 70 from the pivot body 46 and post 40, the connector 64 must be rotated about the shank 70 axis 76. The extent to which the connector 64 must be rotated when fully installed to fully remove the connector 64 from the pivot body 46 and post 40 is a function of the pitch of the threads 78, 82 and the axial length of the shank 70 that is threadedly engaged with the post 40, or the post 40 and pivot body 46 if both contain threads. In at least some implementations, the connector 64 may be fully installed or removed from the post 40 and pivot body 46 by rotating the connector 64 less than one full revolution, such as between ninety (90) and three hundred (300) degrees of rotation, with some implementations requiring only ninety (90) to one hundred eighty (180) degrees of rotation.

To facilitate rotating the connector 64, the head 72 may be formed to be manually manipulated so that a tool is not needed to turn the connector 64. In the example shown, the head 72 is defined by an arm or handle 84 extending perpendicular to the shank 70, and to one side of the shank 70. The handle 84 may have any desired cross-sectional shape and a length suitable for rotation relative to the tailgate 18 (e.g. a function of the distance of the opening in the pivot body 46 from the side of the tailgate 18). Other heads may be used, including but not limited to an enlarged knob or a T-shaped handle that extends in opposite directions from the shank 70, or surfaces on the sides of the shank 70 that may be grabbed by a user.

The retention and release assembly 74 is operable to releasably maintain the installed position of the connector 64 relative to the pivot body 46 and post 40. In at least some implementations, the retention and release assembly 74 includes an actuator 86 and a retainer 88. The retainer 88 may be defined by one or more bodies carried by the shank 70 and movable relative to the shank 70 as controlled by the actuator. In the example shown, the retainer 88 includes two balls carried by the connector 64, which may be received in openings 90 (FIG. 7) in the shank 70, and are movable relative to the shank 70 between retracted and extended positions. In the retracted position, the retainers 88 are closer to the shank axis 76 than in the extended position, and the retainers 88 and shank 70 may be received through the openings 66, 68 in the pivot body 46 and post 40. In the extended position, the retainers 88 extend outwardly from the shank 70 farther than the thread(s) and a distance between outer edges of the retainers 88 is greater than the size/diameter of the opening 68 in at least the post 40. If desired, the retainers 88 may be acted upon by a spring or springs to radially outwardly urge the retainers 88 to the extended position, and upon sufficient force on the connector 64, the retainers 88 may be retracted against the force of the spring to permit removal of the shank 70 from the openings. The openings 90 in the shank 70 may extend radially through the shank 70, may be axially aligned so that the retainers 88 are in the same axial position along the shank 70, and the openings 90, and thus the retainers 88, may be diametrically opposed, if desired. To maintain the retainers 88 within or carried by the shank 70, the openings 90 may have a minimum dimension that is smaller than a maximum dimension of the retainer 88 so that the retainers 88 cannot pass completely through the openings. With circular openings 90 and retainers 88 being spherical balls, the openings 90 may have a smaller diameter than the diameter of the balls. Of course, other arrangements may be used as desired, including non-circular openings 90 and/or non-spherical retainers 88.

In at least some implementations, including the example shown, the actuator 86 of the retention and release assembly 74 includes an inner shaft 92 that is received within a passage 94 in the shank 70. The inner shaft 92 includes one or more voids 96 and is movable relative to the shank 70 from a first position to a second position. In at least some implementations, the inner shaft 92 is slidably received in the passage 94 in the shank 70. In the example shown, two voids 96 are provided with each void 96 associated with a separate one of the retainers 88. In the first position, the voids 96 are axially aligned with the openings 90 in the shank 70 and the retainers 88, and the retainers 88 may move inwardly, at least partially into the voids 96, to the retracted position. In the second position of the inner shaft 92, the voids 96 are not aligned with the openings 90 or retainers 88 and inward movement of the retainers 88 is blocked by the inner shaft 92. Thus, when the inner shaft 92 is in the second position, the retainers 88 are retained in the extended position. This prevents vibrations or other forces from causing retracting of the retainers 88 or rotation of the connector 64 sufficient to partially or fully remove the connector 64 from the post 40. Thus, unintended removal of the connector 64 is prevented.

To facilitate moving the inner shaft 92, a portion of the inner shaft 92 may extend out of and be exposed from the shank 70 or handle. In the example shown, such as in FIG. 7, a first end 98 of the inner shaft 92 extends axially out of an opening 100 at a first end 101 of the shank 70 that is aligned with the passage 94 in the shank 70. A second end 102 of the inner shaft 92 is received in the shank 70 and the passage 94 is closed at one end, although the passage 94 and inner shaft 92 could instead extend through the shank 70, if desired. The inner shaft 92 may be biased by a spring 104 to the second position, which in the example shown, is a position in which the first end of the inner shaft 92 extends farther out of the shank 70. The spring 104 may be received between the shank surface 106 that defines the end of the passage 94 and the second end 102 of the inner shaft 92, or between an enlarged head 108 of the inner shaft 92 and a portion of the shank 70 within the passage 94, or elsewhere, as desired. In the second position, a stop portion 110 of the inner shaft 92 located farther from the first end 98 than the voids 96, is axially aligned with the openings 90 and retainers 88, and the voids 96 are not aligned with the retainers 88.

To move the inner shaft 92 to the first position, the first end 98 of the inner shaft 92 may be pushed to further insert the inner shaft 92 into the passage 94, against the force of the spring 104 or springs that bias the inner shaft 92 to the second position. This movement of the inner shaft 92 relative to the shank 70 moves the stop portion 110 axially away from the openings 90 in the shank 70 and axially aligns the voids 96 in the inner shaft 92 with the openings 90 and with the retainers 88, which is the position shown in FIG. 7. In this first position, as the connector 64 is rotated to disconnect the threads 78, 82 and permit removal of the connector 64 from the post 40 and pivot body 46, the retainers 88 may move inwardly, at least partially into the voids 96 in the inner shaft 92, as described above. This permits the retainers 88 to be received in and pass through the openings 66, 68 in the pivot body 46 and post 40 as the shank 70 is withdrawn from the openings 66, 68. In the example shown, a user may depress or push the first end 98 of the inner shaft 92 to the first position with their thumb while grasping the handle/head 72 with their hand and fingers to permit easy, one-handed release of the retainer 88 and rotation and removal of the connector 64 from the post 40 and pivot body 46.

In at least some implementations, the shank 70 includes a stop surface 112 arranged to engage the pivot body 46 when the connector 64 is fully installed. In at least some implementations, the stop surface 112 extends radially outwardly from the shank 70 and is axially located between the first end 101 of the shank 70 (or the head 72) and a second end 114 of the shank 70. A distance between a surface 116 of the retainers 88 closest to the first end 98 of the inner shaft 92 and the stop surface 112 is equal to or only slightly greater than, or may be slightly less than the combined thickness of the portions of the pivot body 46 and post 40 through which the shank 70 extends. In the example shown, the distance between the stop surface 112 and surfaces 116 of the retainers 88 is determined as a function of the distance between the surface of the pivot body 46 overlapped by the stop surface 112 and the surface of the post 40 (in the illustrated example) adjacent to the retainers 88, and which the retainers 88 engage if a force is applied to the connector 64 tending the remove the shank 70 from the openings 66, 68. In this way, the pivot body 46 can be closely held to the post 40, and in some implementations, a compressive force may be applied to the pivot body 46 and post 40 by the connector 64. This compressive force may reduce vibrations or rattling between the components and/or provide a more secure connection.

In use, the connector 64 is installed to retain the connection between the pivot body 46 to the post 40. To permit removal of the tailgate 18 from the vehicle 10, the connector 64 must be removed. To remove the connector 64, the tailgate 18 is moved to its open position which exposes the handle of the connector 64. The inner shaft 92 is moved to its first position and then the connector 64 is rotated relative to the pivot body 46 until the shank thread 78 is disengaged from the thread 82 in the post 40 and/or pivot body 46. Next, the pivot body 46 may be removed from the post 40, with the post 40 passing out of the opening 62 in the pivot body cavity 56 in a direction perpendicular to the tailgate axis of rotation 20. It is understood that, in some implementations, a connector 64, pivot body 46 and mounting bracket 32 may be provided on each of the opposite sides of the tailgate 18, and that the connector 64 on both sides would then be removed to permit removal of the tailgate 18. In other arrangements, only a single connector 64 is needed at one side of the tailgate 18.

Of course, other arrangements are possible. For example, without limitation, instead of the retainer 88 being defined by balls, the retainer 88 could be a pin or pins could extend outwardly from the shank 70. The inner shaft 92 may have a bent end that extends radially through a side of the shank 70 and which is pushed or pulled to the second position. The inner shaft 92 could be pulled to the first position instead of being pushed, or the inner shaft 92 could be threadedly engaged or otherwise axially movable relative to the inner shaft 92 by rotation of the inner shaft 92. The stop surface 112 could be defined by or extend from the handle, rather than from the shank 70. And still other arrangements and modifications will be apparent to persons of ordinary skill in this art in view of the disclosure provided herein. The tailgate 18 may be a powered tailgate 18 that is driven by a motor or other actuator between its open and closed positions, and an electrical connector 64 for a power supply to the tailgate 18 may be provided at or near the opening 52 in the tailgate 18 in which the pivot body 46 is received. The connector 64 can thus be removed when the connector 64 is removed to fully decouple the tailgate 18 from the vehicle 10.

What is claimed is:

1. A connector for a removable tailgate, comprising:
   a shank having an exterior with a thread, a passage in the shank and an opening from the exterior of the shank to the passage, wherein the opening is formed in an area of the shank that includes the thread;
   an actuator received within the passage and having a stop portion and a void, the actuator being movable relative to the shank from a first position in which the void is aligned with the opening and a second position in which the stop portion is aligned with the opening; and
   a retainer received in the opening and movable relative to the shank from an extended position in which the retainer extends outwardly from the exterior of the shank farther than the thread and a retracted position in which the retainer is received at least partially in the void and in which the retainer does not extend from the exterior of the shank beyond the thread.

2. The connector of claim 1 wherein the actuator is an inner shaft that is slidably received in the passage and which has a first end that extends out of the passage.

3. The connector of claim 2 which includes a spring acting on the inner shaft and biasing the inner shaft to the second position.

4. The connector of claim 1 wherein the shank includes a stop surface spaced from the retainer and adapted to engage a component that receives the shank of the connector.

5. The connector of claim 1 wherein the opening extends radially through the shank and the opening has a minimum dimension that is smaller than a maximum dimension of the retainer so that the retainer cannot pass completely through the opening.

6. The connector of claim 1 which also includes a head connected to the shank and extending outwardly from the shank.

7. The connector of claim 2 wherein the first end of the inner shaft extends farther out of the shank in the second position than in the first position.

8. A tailgate assembly, comprising:
   a mounting bracket adapted to be connected to a vehicle body and having an opening with an internal thread;
   a pivot body connected to the mounting bracket and having an opening;
   a tailgate coupled to the pivot body for rotation between an open position and a closed position; and
   a connector having a shank and a retention and release assembly, wherein the shank has an exterior with a thread, a passage in the shank and an opening from the exterior of the shank to the passage, and the opening is located in a portion of the shank that includes the thread, and wherein the retention and release assembly includes an inner shaft and a retainer, wherein the inner shaft is received within the passage and has a stop portion and a void, the inner shaft is movable from a first position in which the void is aligned with the opening and a second position in which the stop surface is aligned with the opening, and wherein the retainer is received in the opening, is movable relative to the shank, and has an extended position in which the retainer extends outwardly from the exterior of the shank farther than the thread of the shank, and a retracted position in which the retainer is received at least partially in the void and in which the retainer does not extend from the exterior of the shank beyond the thread.

9. The assembly of claim 8 which includes a spring acting on the inner shaft and biasing the inner shaft to the second position.

10. The connector of claim 9 wherein the first end of the inner shaft extends farther out of the shank in the second position than in the first position.

11. The assembly of claim 8 wherein the shank includes a stop surface spaced from the retainer and engaged with the pivot body when the connector is installed to the pivot body and mounting bracket.

12. The assembly of claim 11 wherein the stop surface engages the pivot body and the retainer engages the mounting bracket, and the connector applies a compressive force to the pivot body and mounting bracket via the stop surface and retainer.

13. The assembly of claim 8 wherein the opening extends radially through the shank and the opening has a minimum dimension that is smaller than a maximum dimension of the retainer so that the retainer cannot pass completely through the opening.

14. The assembly of claim 8 wherein the connector also includes a head connected to the shank and extending outwardly from the shank, and by which the shank is rotated relative to the pivot body.

15. The assembly of claim 8 wherein the mounting bracket includes a post in which the opening with the internal thread is located, and wherein the pivot body includes a cavity in which the post is received with the opening in the pivot body is aligned with the opening in the post.

16. The assembly of claim 15 wherein the cavity is U-shaped having an open side through which the post is received into the cavity.

17. The assembly of claim 15 wherein the cavity includes flat sides and the post includes flat sides such that when the post is received in the cavity, the pivot body cannot rotate relative to the post.

18. The assembly of claim 8 wherein the retainer is defined by a pair of balls, and wherein the shank includes two openings with each opening adapted to receive a separate one of the balls.

19. The assembly of claim 18 wherein the two openings are diametrically opposed and axially aligned.

20. A tailgate assembly, comprising:
a mounting bracket adapted to be connected to a vehicle body and having an opening with an internal thread;
a pivot body connected to the mounting bracket and having an opening;
a tailgate coupled to the pivot body for rotation between an open position and a closed position; and
a connector having a shank and a retention and release assembly, wherein the shank has an exterior with a thread, a passage in the shank and an opening from the exterior of the shank to the passage, and wherein the retention and release assembly includes an inner shaft and a retainer, wherein the inner shaft is received within the passage and has a stop portion and a void, the inner shaft is movable from a first position in which the void is aligned with the opening and a second position in which the stop surface is aligned with the opening, and wherein the retainer is received in the opening, is movable relative to the shank, and has an extended position in which the retainer extends outwardly from the exterior of the shank farther than the thread of the shank, and a retracted position in which the retainer is received at least partially in the void and in which the retainer does not extend from the exterior of the shank beyond the thread, wherein the internal thread and the thread of the shank are arranged so that the connector is movable to an installed position coupling the pivot body to the mounting bracket, and the connector is removable from the pivot body and mounting bracket with a rotation of the shank of between 90 and 300 degrees.

\* \* \* \* \*